(12) United States Patent
Liao et al.

(10) Patent No.: US 10,128,895 B2
(45) Date of Patent: Nov. 13, 2018

(54) WIRELESS COMMUNICATION DEVICE

(71) Applicant: ASUSTeK COMPUTER INC., Taipei (TW)

(72) Inventors: Kuo-Chu Liao, Taipei (TW); Wei-Cheng Lo, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 131 days.

(21) Appl. No.: 15/381,035

(22) Filed: Dec. 15, 2016

(65) Prior Publication Data

US 2017/0179997 A1    Jun. 22, 2017

(30) Foreign Application Priority Data

Dec. 22, 2015    (CN) .......................... 2015 1 0971029

(51) Int. Cl.
*H04B 1/44*    (2006.01)
*H04B 7/06*    (2006.01)
*H04J 1/02*    (2006.01)
*H04W 72/04*    (2009.01)
*H04B 1/00*    (2006.01)
*H04B 7/08*    (2006.01)

(52) U.S. Cl.
CPC ............... *H04B 1/44* (2013.01); *H04B 1/005* (2013.01); *H04B 7/0602* (2013.01); *H04B 7/0802* (2013.01); *H04J 1/02* (2013.01); *H04W 72/0453* (2013.01)

(58) Field of Classification Search
CPC ............ H04B 1/44; H04B 1/005; H04L 1/003
See application file for complete search history.

(56) References Cited

U.S. PATENT DOCUMENTS

2014/0023123 A1*  1/2014  Wang ................... H01Q 1/243
                                                              375/219
2014/0315497 A1   10/2014  Wu et al.

FOREIGN PATENT DOCUMENTS

CN            104113357         10/2014

\* cited by examiner

*Primary Examiner* — Shukri Taha
(74) *Attorney, Agent, or Firm* — JCIPRNET

(57) ABSTRACT

A wireless communication device is provided. The wireless communication device comprises: a first antenna for receiving and transmitting a first sub-band signal of a first frequency band and a second sub-band signal of the first frequency band; a second antenna for receiving and transmitting the second sub-band signal and a second frequency band signal; a third antenna for receiving and transmitting a first sub-band diversity signal of the first frequency band; a first frequency-division multiplex coupled to the first antenna; a switching circuit coupled to the first frequency-division multiplex and the second antenna; a primary path component coupled to the first frequency-division multiplex and the switching circuit; a secondary path component coupled to the switching circuit and the third antenna; a first transceiver coupled to the primary path component and the secondary path component; and a second transceiver coupled to the switching circuit.

10 Claims, 4 Drawing Sheets

WIRELESS COMMUNICATION DEVICE

CROSS-REFERENCE TO RELATED APPLICATION

This application claims the priority benefit of China application serial No. 201510971029.9, filed on Dec. 22, 2015. The entirety of the above-mentioned patent application is hereby incorporated by references herein and made a part of specification.

BACKGROUND OF THE INVENTION

Field of the Invention

The invention relates to a wireless communication device and, more specifically, to a radiofrequency (RF) front-end circuit of a wireless communication device.

Description of the Related Art

With the development of wireless communication technology, wireless communication devices are popular in our daily life. Generally, wireless signals are transmitted or received via an antenna configured at the wireless communication devices. Conventionally, a common wireless communication system includes a mobile communication system (such as GSM, 3G, LTE), a wireless local area network (such as Wi-Fi, WiMax), a wireless personal-area network (such as Bluetooth) or a Global Positioning System (GPS). To prevent mutual interference among the signals from different wireless communication systems, different operating frequency bands and communication technologies (including modulation, coding and encryption) are used by different wireless communication systems. Since the spectrum resources are limited, some of the wireless communication systems need to use similar operating frequency bands. For example, according to the communication protocols IEEE 802.15.1 and IEEE 802.11 for Bluetooth and Wi-Fi, their operating frequency bands are near 2.4 GHz in the industrial, scientific and medical (ISM) frequency band (for IEEE 802.11a, the operating frequency bands are at 5 GHz).

A wireless communication device with multiple wireless communication systems usually has a plurality of antennas. It is preferred that each wireless communication system has its exclusive and independent antenna. However, a space for the antennas is limited in consideration of the size of the wireless communication device and the design requirement. Therefore, to reduce the space for antennas, two wireless communication systems (such as Bluetooth and Wi-Fi) using similar operating frequency bands are configured to share one antenna. However, in this case, when the first wireless communication system communicates via the shared antenna, the second wireless communication system has to stop the communication with the shared antenna. Thus, the communication efficiency of the second wireless communication system is reduced.

BRIEF SUMMARY OF THE INVENTION

According to first aspect of the disclosure, a wireless communication device comprises: a first antenna for receiving and transmitting a first sub-band signal of a first frequency band and a second sub-band signal of the first frequency band; a second antenna for receiving and transmitting the second sub-band signal and a second frequency band signal; a third antenna for receiving and transmitting a first sub-band diversity signal of the first frequency band; a first frequency-division multiplex coupled to the first antenna; a switching circuit coupled to the first frequency-division multiplex and the second antenna; a primary path component coupled to the first frequency-division multiplex and the switching circuit; a secondary path component coupled to the switching circuit and the third antenna; a first transceiver coupled to the primary path component and the secondary path component; and a second transceiver coupled to the switching circuit, wherein when the second transceiver is in a working state, the switching circuit connects the second antenna with the second transceiver and connects the first frequency-division multiplex to the primary path component to make the first transceiver receive and transmit the first sub-band signal and the second sub-band signal via the first antenna while the second transceiver receives and transmits the second frequency band signal via the second antenna.

In sum, according to the operating frequency band and the operating state of the wireless transceiver, the operating frequency band for the antenna is configured and the connections between the wireless transceivers and the antennas of the wireless communication device are adjusted. As a result, the space for the antenna is reduced while the communication efficiency of each wireless transceiver is kept above a certain level. Furthermore, the wireless communication device supports both the multiple-input and multiple-output (MIMO) technology and the antenna diversity technology. Additionally, a proper antenna can be selected for a frequency band signal that is easily interfered, thus, user experience in operating the wireless communication device is improved.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

The present invention is described in detail accompanying with the figures. The similar reference symbol denotes the similar component/element.

Figure 1:
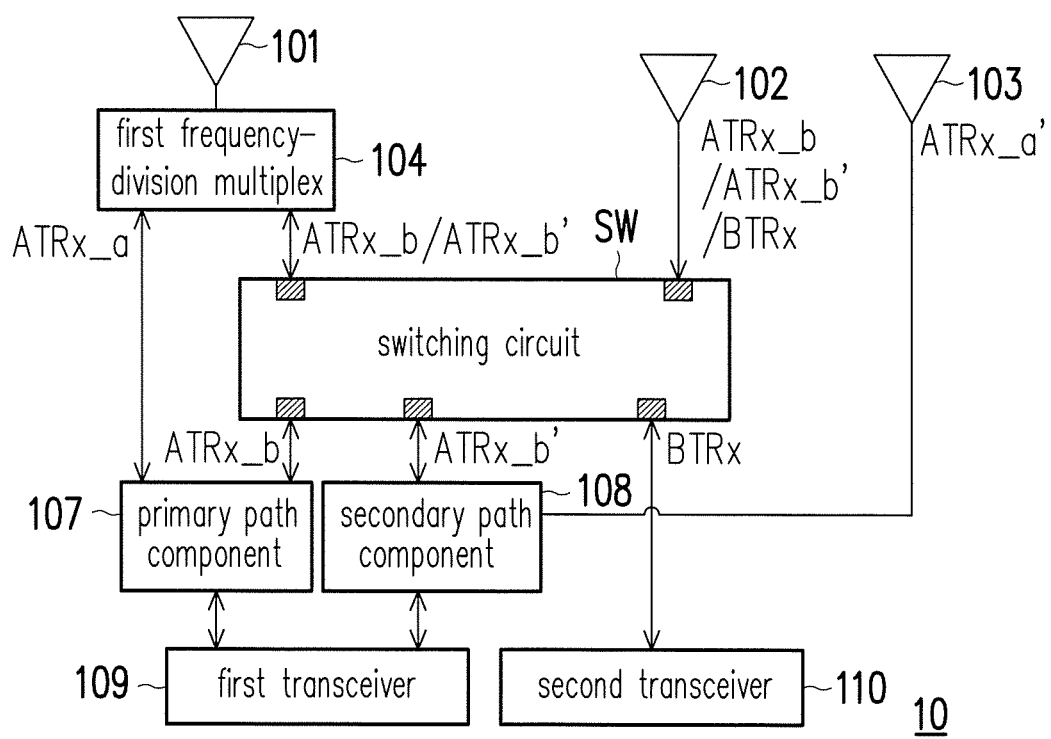
FIG. 1 is a schematic diagram showing a wireless communication device in an embodiment.

FIG. 1 is a schematic diagram showing a wireless communication device in an embodiment. Please refer to FIG. 1, a wireless communication device 10 includes a first antenna 101, a second antenna 102, a third antenna 103, a first frequency-division multiplex 104, a switching circuit SW, a primary path component 107, a secondary path component 108, a first transceiver 109, and a second transceiver 110. In embodiments, the wireless communication device 10 is a smartphone, a personal digital assistant, a tablet computer, or a notebook with a wireless radiofrequency (RF) circuit. The wireless communication device 10 transmits or receives wireless RF signals via the first antenna 101, the second antenna 102 and the third antenna 103.

The wireless communication device 10 supports multiple wireless communication standards to communicate via various wireless communication technologies. The first antenna 101, the second antenna 102 and the third antenna 103 operate at proper frequency bands according to the wireless communication standards supported by the wireless communication device 10. In an embodiment, the operating frequency bands for the first antenna 101, the second antenna 102 and the third antenna 103 of the wireless communication device 10 are configured to receive and transmit wireless RF signals via a Long Term Evolution (LTE) system, a Worldwide Interoperability for Microwave Access (WiMAX) system, a Digital Television Broadcasting (DTV) system, a Global Positioning System (GPS), a Wireless Wide Area Network (WWAN) system, a Wireless Local Area Network (WLAN) system, a Ultra-Wideband (UWB) system, a Wireless Personal Area Network (WPAN) system or other wireless mobile communication systems.

In the embodiment, the first antenna 101 is configured to receive and transmit a first sub-band signal ATRx_a of a first frequency band and a second sub-band signal ATRx_b of the first frequency band, or a second sub-band diversity signal ATRx_b' of the first frequency band. The second antenna 102 is configured to receive and transmit either a second sub-band signal ATRx_b of the first frequency band or the second sub-band diversity signal ATRx_b', and a second frequency band signal BTRx. The third antenna 103 is configured to receive and transmit a first sub-band diversity signal ATRx_a' of the first frequency band. The first transceiver 109 supporting a first wireless communication protocol communicates via the first sub-band signal ATRx_a and the second sub-band signal ATRx_b, and the second transceiver 110 supporting a second wireless communication protocol communicates via the second frequency band signal BTRx. In an embodiment, the first sub-band signal ATRx_a and the second sub-band signal ATRx_b are transmitted at LTE communication frequency band, while the second frequency band signal is transmitted at 2G communication frequency band.

The first frequency-division multiplex 104 is coupled to the first antenna 101, the RF signals received by the first antenna 101 are classified into the first sub-band signals ATRx_a and the second sub-band signals ATRx_b that correspond to different frequency bands, respectively. In an embodiment, the first frequency-division multiplex 104 is a duplexer or a triplexer. The switching circuit SW is coupled to the first frequency-division multiplex 104 and the second antenna 102. In an embodiment, the switching circuit SW is one or a combination of a switch, a multiplexer, a logic circuit, which is not limited herein.

In an embodiment, the first transceiver 109 includes a digital-analog converter, an analog-digital converter, a low noise amplifier, an impedance matching circuit, a mixer, an upconverter, a downconverter and a filter. Similarly, the second transceiver 110 includes a digital-analog converter, an analog-digital converter, a low noise amplifier, an impedance matching circuit, a mixer, an upconverter, a downconverter and a filter. In the embodiment, the first transceiver 109 supports the MIMO technology and the antenna diversity technology. The first transceiver 109 is coupled to the primary path component 107 and the secondary path component 108, and then the RF signals received from different antennas, or the carrier signals corresponding to different frequency bands are processed separately.

The primary path component 107 is coupled to the first frequency-division multiplex 104 and the switching circuit SW. The secondary path component 108 is coupled to the switching circuit SW and the third antenna 103. the primary path component 107 and the secondary path component 108 receive the RF signals of different frequency bands via different antennas are process the RF signals of different frequency bands respectively. The second transceiver 110 is coupled to the switching circuit SW. That is, the primary path component 107 receives the first sub-band signal ATRx_a via the first antenna 101 or transmits the first sub-band signal ATRx_a to the first antenna 101. The primary path component 107 is also capable of receiving the second sub-band signal ATRx_b via the first antenna 101 or transmitting the second sub-band signal ATRx_b to the first antenna 101. In the embodiment, according to a signal path connecting state of the switching circuit SW, the first transceiver 109 transmits or receives the second sub-band signal ATRx_b via the first antenna 101 or the second antenna 102. Furthermore, according to the connecting state of the switching circuit SW, when the second transceiver 110 is in a working state, the second transceiver 110 transmits or receives the second frequency band signal BTRx via the second antenna 102.

In an embodiment, when the second transceiver 110 is in the working state, the switching circuit SW connects the second antenna 102 to the second transceiver 110 and connects the first frequency-division multiplex 104 to the primary path component 107, then the first transceiver 109 receives and transmits the first sub-band signal ATRx_a and the second sub-band signal ATRx_b via the first antenna 101, and receives and transmits the first sub-band diversity signal ATRx_a' via the third antenna 103, while the second transceiver 110 receives and transmits the second frequency band signal BTRx via the second antenna 102. Therefore, the first transceiver 109 receives and transmits the first sub-band signal ATRx_a via the first antenna 101, and receives and transmits the first sub-band diversity signal ATRx_a' via the third antenna 103, for executing the antenna diversity function, such as the antenna transmission diversity and antenna reception diversity.

In an embodiment, when the second transceiver 110 is in a non-working state, the switching circuit SW connects the second antenna 102 to the primary path component 107 or the secondary path component 108, and the switching circuit SW connects the first frequency-division multiplex 104 to the primary path component 107 or the secondary path component 108. The non-working state includes a standby mode, a sleep mode and a shutdown mode at which the second transceiver 110 stops transmitting or receiving data. Therefore, the first transceiver 109 receives or transmits the second sub-band signal ATRx_b and the second sub-band diversity signal ATRx_b' via the first antenna 101 and the second antenna 102 simultaneously to execute the antenna diversity function, such as the antenna transmission diversity or the antenna reception diversity.

Figure 2:
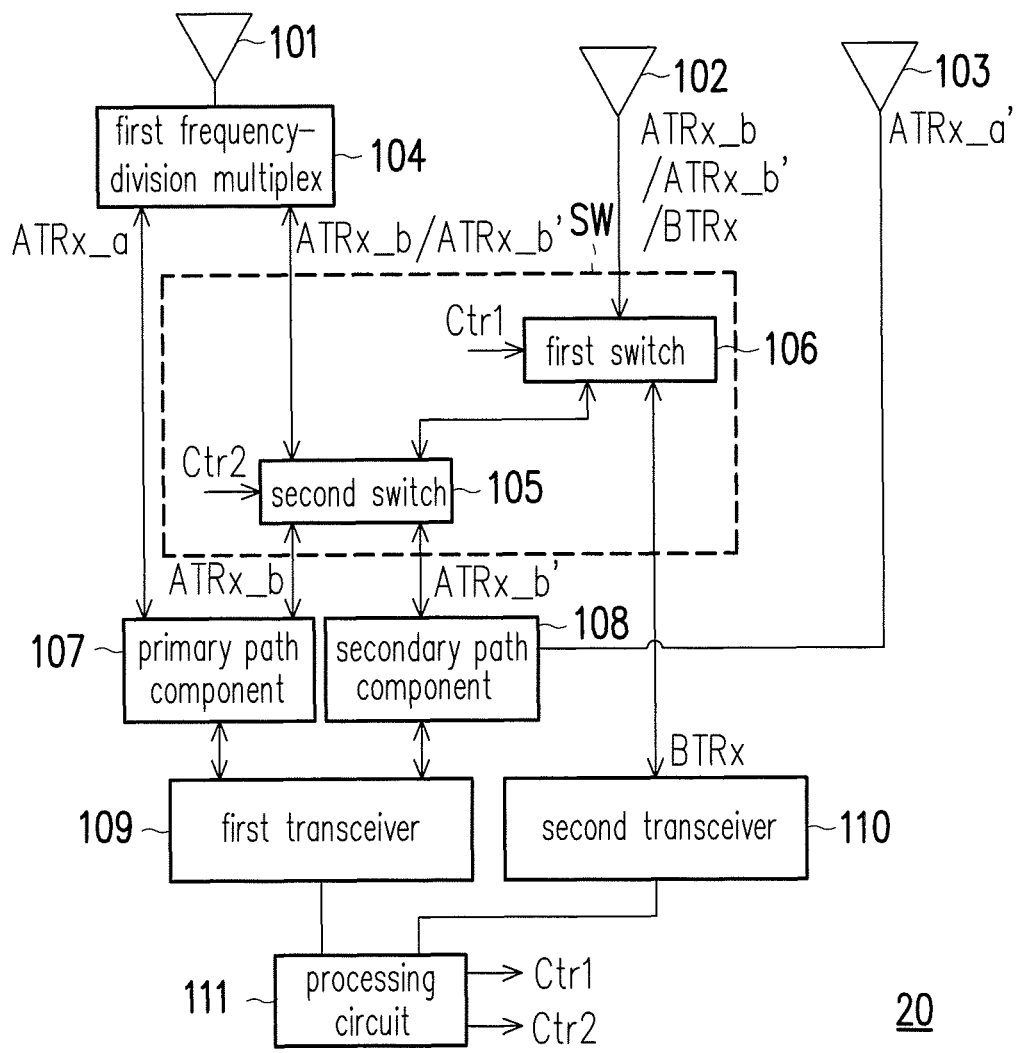
FIG. 2 is a schematic diagram showing a wireless communication device in an embodiment.

In FIG. 2, a switching circuit SW includes two switchers, which is not limited herein. FIG. 2 is a schematic diagram showing a wireless communication device in an embodiment. Please refer to FIG. 2, a wireless communication device 20 includes the first antenna 101, the second antenna 102, the third antenna 103, the first frequency-division multiplex 104, the switching circuit SW, the primary path component 107, the secondary path component 108, the first transceiver 109, the second transceiver 110, and a processing circuit 111.

In the embodiment, the switching circuit SW includes a first switcher 106 and a second switcher 105. The first switcher 106 is coupled to the second antenna 102, the second transceiver 110 and the second switcher 105. The second switcher 105 is coupled to the first frequency-division multiplex 104, the primary path component 107 and the secondary path component 108. The first switcher 106 determines whether to connect the second antenna 102 with the second switcher 105 or with the second transceiver 110 according to a first control signal Ctr1, while the second switcher 105 determines whether to connect the first frequency-division multiplex 104 with the primary path component 107 or with the secondary path component 108 according to a second control signal Ctr2.

In an embodiment, the first switcher 106 is a single-pole double-throw switch for connecting the second antenna 102 with the second switcher 105 or the second transceiver 110 according to the first control signal Ctr1. In other embodiments, any switcher that provides different paths for signal transmission can be used as the first switcher 106. The second switcher 105 is a double-pole double-throw switch that provides two switching states (that is, parallel connecting and cross connecting) according to the second control signal CTR2. In other embodiments, any switcher that provides different paths for signal transmission can be used as the second switcher 105.

The processing circuit 111 controls the communication of the wireless communication device 20 to generate, process or receive the digital data transmitted by the RF signals. The processing circuit 111 is including a built-in memory or coupled to a peripheral memory circuit to access the procedure code, the codebook, the buffered data or the permanent data. In an embodiment, the processing circuit 111 is one or a combination of hardware, firmware and software. The firmware is a basic input/output system (BIOS). The software is an operating system (OS), a driver, an application and/or other software. In an embodiment, the processing circuit 111 includes an application processor (AP) and a communication processor (CP). The application processor is, but not limited to, a CPU, a microprocessor, a chipset (such as a south bridge chip) and/or other operating circuits. According to the wireless communication protocol supported by the wireless communication device 10, data transmitted via the first transceiver 109 and the second transceiver 110 is modulated/demodulated, encoded/decoded, or encrypted/decrypted by the communication processor.

The processing circuit 111 controls the connecting state of the switching circuit SW. The processing circuit 111 is coupled to the first transceiver 109 and the second transceiver 110. The processing circuit 111 generates a first control signal Ctr1 according to the operating state of the second transceiver 110. The operating state of the second transceiver 110 includes a working state and a non-working state. In the embodiment, the processing circuit 111 controls the connecting state of the switching circuit SW according to the priority in data transmission and the operating state of the second transceiver 110. In the embodiment, the data (such as voice daa) transmitted via the second transceiver 110 has higher priority than the data transmitted via the first transceiver 109. Therefore, when the second transceiver 110 operates in the working state, the processor 111 controls the first switcher 106 according to the first control signal Ctr1, and then the first switcher 106 connects the second antenna to the second transceiver 110. When the second transceiver 110 operates in the non-working state, the processor 111 generates a first control signal Ctr1 to control the first switcher 106, and then the first switcher 106 connects the second antenna 102 to the second switcher 105, and thus the MIMO function or the antenna diversity function is performed by the first transceiver 109 via the second antenna 102.

Figure 3:
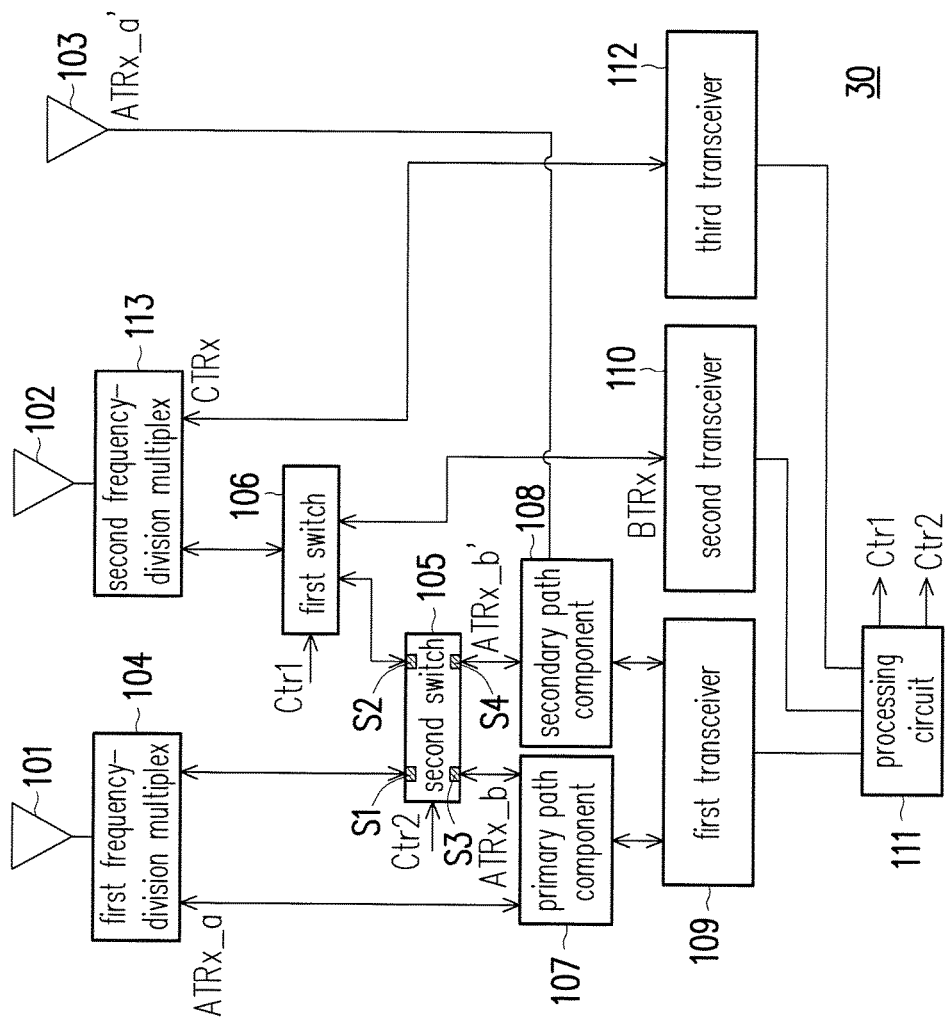
FIG. 3 is a schematic diagram showing a wireless communication device in an embodiment.

FIG. 3 is a schematic diagram showing a wireless communication device in an embodiment. In the embodiment as shown in FIG. 3, in addition to the second sub-band signal ATRx_b, the second sub-band signal ATRx_b' and the second frequency band signal BTRx, the second antenna 102 is configured to further receive and transmit a third frequency band signal CTRx. Please refer to FIG. 3, in addition to the first antenna 101, the second antenna 102, the first frequency-division multiplex 104, the first switcher 106, the second switcher 105, the primary path component 107, the secondary path component 108, the first transceiver 109, the second transceiver 110, and the processing circuit 111, a wireless communication device 30 further includes a third antenna 103, a second frequency-division multiplex 113 and a third transceiver 112.

In the embodiment, the third antenna 103 is configured to receive and transmit a first sub-band diversity signal ATRx_a'. The third antenna 103 is coupled to the secondary path component 108. The third transceiver 112 supports the third wireless communication protocol, receives and transmits the third frequency band signal CTRx at a corresponding third frequency band via the second antenna 102. The second frequency-division multiplex 113 is coupled between the first switcher 106 and the second antenna 102. The third transceiver 112 is coupled to the second frequency-division multiplex 113 to receive and transmit the third frequency band signal CTRx via the second antenna 102. The RF signals received and transmitted by the second antenna 102 are allocated to two signal paths by the second frequency-division multiplex 113. The signal path connecting to the first switcher 106 is used to transmit either the second sub-band diversity signal ATRx_b or the second sub-band diversity signal ATRx_b', and the second frequency band signal BTRx, and the signal path connecting to the third transceiver 112 is used to transmit the third frequency band signal CTRx.

As shown in FIG. 3, in the embodiment, the second antenna 102 is shared among the first transceiver 109, the second transceiver 110 and the third transceiver 112. In an embodiment, when the data transmitted via the second transceiver 110 has priority over the data transmitted via the first transceiver 109, and the second transceiver 110 operates in the working state, the second antenna 102 is shared between the second transceiver 110 and the third transceiver 112. On the other hand, when the second transceiver 110 operates in the non-working state, the second antenna 102 is showed between the first transceiver 109 and the third transceiver 112 s.

In an embodiment, when the second transceiver 110 operates in the working state, the processing circuit 111 generates a first control signal Ctr1 to control the first switcher 106 to connect with the second frequency-division multiplex 113 and the second transceiver 110, and generates a second control signal Ctr2 to control the second switcher 105 to keep in the first switching state.

In an embodiment, when the second transceiver 110 operates in the non-working state, the processing circuit 111 compares the signal quality reference of the first antenna 101 with that of the second antenna 102 to generate a second control signal Ctr2, for controlling the second switcher 105 to be in the first switching state or the second switching state. The signal quality reference is, but not limited to, a received signal strength indication (RSSI), a signal noise ratio (SNR) or a parameter indicating the antenna efficiency/data transmission efficiency. When the second switcher 105 is in the first switching state, the second switcher 105 connects the first frequency-division multiplex 104 to the primary path component 107, and connects the first switcher 106 to the secondary path component 108. In other words, when the second switcher 105 is in the first switching state, a connecting port S1 of the second switcher 105 is connected to the connecting port S3 of the second switcher 105, and the connecting port S2 of the second switcher 105 is connected to the connecting port S4 of the second switcher 105. When the second switcher 105 is in the second switching state, the second switcher 105 connects the first frequency-division multiplex 104 to the secondary path component 108 and connects the first switcher 106 to the primary path component 107. In other words, when the second switcher 105 is in the second switching state, the connecting port S1 of the second switcher 105 is connected to the connecting port S4 of the second switcher 105, and the connecting port S2 of the second switcher 105 is connected to the connecting port S3 of the second switcher 105.

In this way, when the second transceiver 110 operates in the non-working state, the processing circuit 111 is configured to select the first antenna 101 or the second antenna 102 as a primary receiving and transmitting antenna of the wireless communication device 10 via the second switcher 105. That is, the processing circuit 111 is configured to select the first antenna 101 or the second antenna 102 to be connected to the primary path component 107. In an embodiment, compared with the first sub-band signal ATRx_a transmitted at the first sub-band, the second sub-band signal ATRx_b transmitted at the second sub-band is more easily interfered by environmental conditions (for example, the antenna efficiency is reduced when a metal is hold in hand). Thus, the processing circuit 111 is configured to select the suitable antenna for transmitting or receiving the second sub-band signal ATRx_b according to the signal quality reference.

Figure 4:
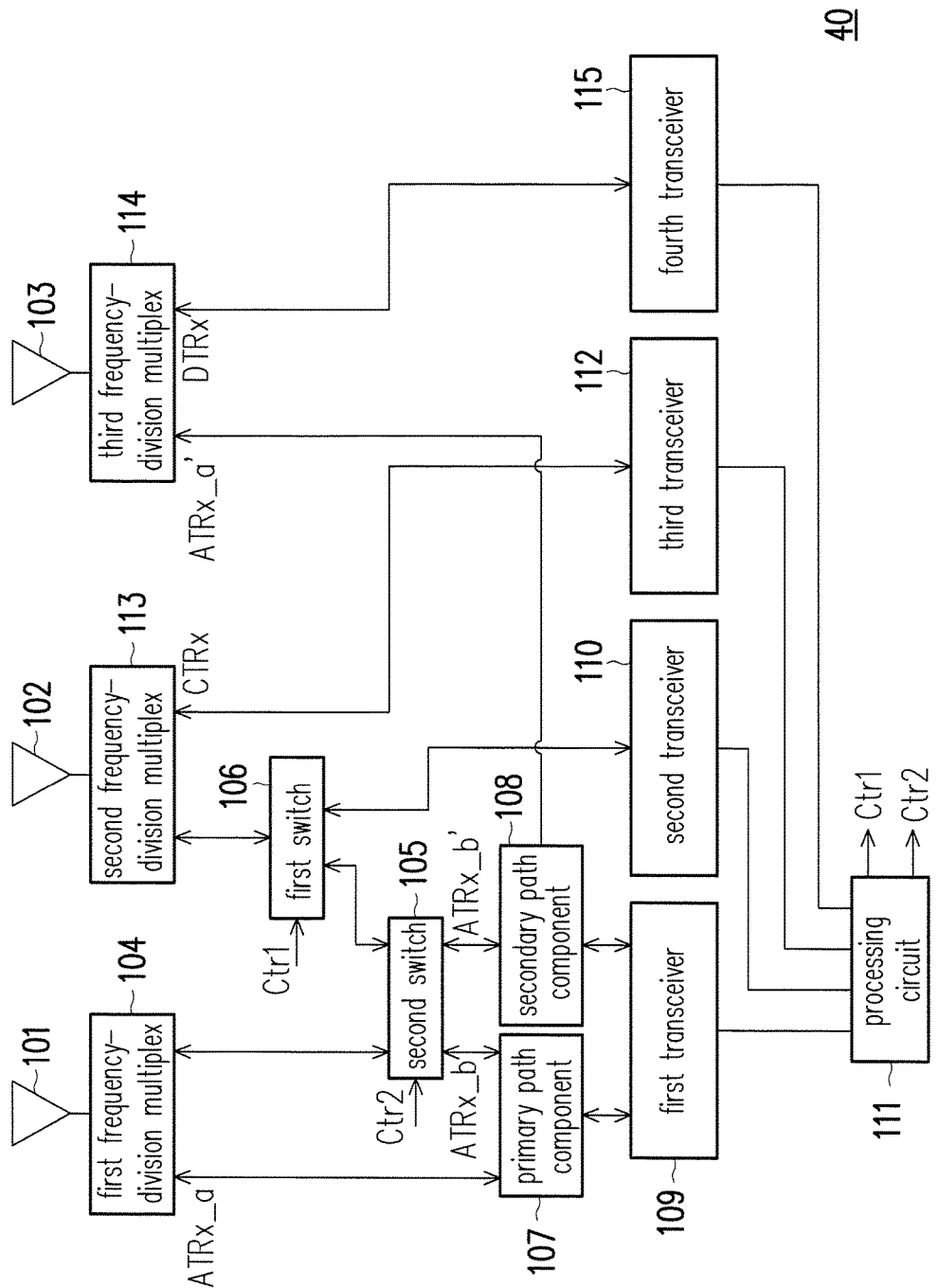
FIG. 4 is a schematic diagram showing a wireless communication device in an embodiment.

FIG. 4 is a schematic diagram showing a wireless communication device in an embodiment. As shown in FIG. 4, in this embodiment, the second antenna 102 is configured to receive and transmit either the first sub-band signal ATRx_b or the first sub-band signal ATRx_b', the second frequency band signal BTRx and the third frequency band signal CTRx, while the third antenna 103 is configured to receive and transmit the first sub-band diversity signal ATRx_a and a fourth frequency band signal DTRx. Please refer to FIG. 4, in addition to the first antenna 101, the second antenna 102, the third antenna 103, the first frequency-division multiplex 104, the second frequency-division multiplex 113, the first switcher 106, the second switcher 105, the primary path component 107, the secondary path component 108, the first transceiver 109, the second transceiver 110, the third transceiver 112, and the processing circuit 111, a wireless communication device 40 further includes a third frequency-division multiplex 114 and a fourth transceiver 115.

The third frequency-division multiplex 114 is coupled between the secondary path component 108 and the third antenna 103. The RF signals received and transmitted via the third antenna 103 are allocated to two signal paths by the third frequency-division multiplex 114. The signal path connecting to the secondary path component 108 is used to transmit the first sub-band diversity signal ATRx_a', and the signal path connecting to the fourth transceiver 115 is used to transmit the fourth frequency band signal DTRx.

The fourth transceiver 115 is coupled to the third frequency-division multiplex 114. The fourth transceiver 115 supports the fourth wireless communication protocol, and receives and transmits the fourth frequency band signal DTRx via the third antenna 103. According to the third wireless communication protocol supported by the third transceiver 112 and the fourth wireless communication protocol supported by the fourth transceiver 115, each of the third transceiver 112 and the fourth transceiver 115 includes, but not limited to, a digital-analog converter, an analog-digital converter, a low noise amplifier, an impedance matching circuit, a mixer, a upconverter, a downconverter and a filter. Conventionally, each of the primary path component 107, the secondary path component 108, the second transceiver 110, the third transceiver 112, and the fourth transceiver 115 has its exclusive and independent antenna. In the embodiment, while the number of the antennas is reduced from five to three, the MIMO function or the antenna diversity function can be performed by the first transceiver 109.

In sum, in embodiments, according to the operating frequency band and the operating state of the wireless transceiver, the operating frequency band for the antenna is configured and the connections between the wireless transceivers and the antennas of the wireless communication device are adjusted. As a result, the space for holding the antennas is reduced while the communication efficiency of each wireless transceiver is kept above a certain level. Furthermore, the wireless communication device supports both the multiple-input and multiple-output (MIMO) technology and the antenna diversity technology. Additionally, a proper antenna can be selected for a frequency band signal that is easily interfered, thus, user experience in operating the wireless communication device is improved.

Although the invention has been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. A wireless communication device comprising:
   a first antenna for receiving and transmitting a first sub-band signal of a first frequency band and a second sub-band signal of the first frequency band;
   a second antenna for receiving and transmitting the second sub-band signal and a second frequency band signal;
   a third antenna for receiving and transmitting a first sub-band diversity signal of the first frequency band;
   a first frequency-division multiplex coupled to the first antenna;
   a switching circuit coupled to the first frequency-division multiplex and the second antenna;
   a primary path component coupled to the first frequency-division multiplex and the switching circuit;
   a secondary path component coupled to the switching circuit and the third antenna;
   a first transceiver coupled to the primary path component and the secondary path component; and
   a second transceiver coupled to the switching circuit,
   wherein when the second transceiver is in a working state, the switching circuit connects the second antenna with the second transceiver and connects the first frequency-division multiplex to the primary path component to make the first transceiver receive and transmit the first sub-band signal and the second sub-band signal via the first antenna while the second transceiver receives and transmits the second frequency band signal via the second antenna.

2. The wireless communication device according to claim 1, wherein the switching circuit includes:
   a first switcher coupled to the second antenna and the second transceiver; and a second switcher coupled to the first frequency-division multiplex, the primary path component and the secondary path component,
wherein the first switcher determines whether the second antenna is connected to the second switcher or the second transceiver according to a first control signal, the second switcher determines whether the first frequency-division multiplex is connected to the primary path component or the secondary path component according to a second control signal.

3. The wireless communication device according to claim 2, wherein when the second switcher is in a first switching state, the second switcher connects the first frequency-division multiplex to the primary path component and connects the first switcher to the secondary path component; and when the second switcher is in a second switching state, the second switcher connects the first frequency-division multiplex to the secondary path component and connects the first switcher to the primary path component.

4. The wireless communication device according to claim 2, further comprising:
a processing circuit coupled to the first transceiver and the second transceiver, wherein a processing circuit generates the first control signal according to an operating state of the second transceiver, and the operating state of the second transceiver includes a working state and an non-working state.

5. The wireless communication device according to claim 4, wherein when the second transceiver is in the non-working state, the processing circuit generates the first control signal to control the first switcher to connect the second antenna with the second switcher.

6. The wireless communication device according to claim 4, wherein when the second transceiver is in the non-working state, the processing circuit compares a signal quality reference of the first antenna with the signal quality reference of the second antenna to generate the second control signal to control the second switcher to be in a first switching state or in a second switching state.

7. The wireless communication device according to claim 4, further comprising:
a second frequency-division multiplex coupled between the first switcher and the second antenna, wherein the second antenna is configured to receive and transmit a third frequency band signal; and
a third transceiver coupled to the second frequency-division multiplex for receiving and transmitting the third frequency band signal via the second antenna.

8. The wireless communication device according to claim 7, further comprising:
a third frequency-division multiplex coupled between the secondary path component and the third antenna, wherein the third antenna is configured to receive and transmit a fourth frequency band signal; and
a fourth transceiver coupled to the third frequency-division multiplex for receiving and transmitting the fourth frequency band signal via the third antenna.

9. The wireless communication device according to claim 1, wherein a data transmitted via the second transceiver has priority over a data transmitted via the first transceiver.

10. The wireless communication device according to claim 9, wherein the data transmitted via the second transceiver includes voice data.

* * * * *